United States Patent [19]

Hansen

[11] Patent Number: 4,576,481
[45] Date of Patent: Mar. 18, 1986

[54] PASSIVE OPTICAL POSITION MEASUREMENT SYSTEM

[75] Inventor: Per K. Hansen, Burlington, Vt.

[73] Assignee: Position Orientation Systems, Ltd., S. Burlington, Vt.

[21] Appl. No.: 449,235

[22] Filed: Dec. 13, 1982

[51] Int. Cl.[4] .............................................. G01B 7/03
[52] U.S. Cl. .................................... 356/375; 356/373; 356/446; 250/578
[58] Field of Search ....................... 356/373, 375, 1, 4, 356/446; 250/578

[56] References Cited

U.S. PATENT DOCUMENTS

| | | | |
|---|---|---|---|
| 3,240,942 | 3/1966 | Birnbaum et al. | 250/203 |
| 3,430,047 | 2/1969 | Hurkamp | 356/4 |
| 3,706,493 | 12/1972 | Redmann | 356/4 |
| 3,875,402 | 4/1975 | Parkin | 250/203 R |
| 3,907,434 | 9/1975 | Coles | 356/4 |
| 3,914,596 | 10/1975 | Finkel et al. | 250/203 R |
| 4,123,165 | 10/1978 | Brown et al. | 356/152 |
| 4,335,962 | 6/1982 | DiMatteo et al. | 356/375 |
| 4,425,043 | 1/1984 | van Rosmalen | 356/375 |
| 4,427,880 | 1/1984 | Kanade et al. | 356/4 |

OTHER PUBLICATIONS

Taylor et al., "An Automated Motion Measurement System for Clinical Gait Analysis", J. Biomechanics 1982, (vol. 15), pp. 505-516.
Article entitled "Stepping Out", by Robert Teitelman, Forbes Magazine, Jun. 18, 1984, pp. 154, 156, 157.
P. 42, EDN Magazine, Jun. 20, 1985.

Primary Examiner—R. A. Rosenberger
Assistant Examiner—Crystal Cooper
Attorney, Agent, or Firm—Sherman and Shalloway

[57] ABSTRACT

A device is disclosed which enables calculation of the location of an object within a three dimensional work area. The system utilizes a pair of position sensing detectors each of which is surrounded by light emitting diodes (LED's) and requires attachment of a retro-reflector to each target whose position is to be determined. In a preferred embodiment, each position sensing detector is surrounded by infrared LED's of two different light wavelengths. Two targets are present in the work area each with a retro-reflector attached thereto and each including a single bandpass filter, in front of its retro-reflector, one target having a bandpass filter corresponding to one LED wavelength and the other target having a bandpass filter corresponding to the other LED wavelength. Circuitry is also disclosed which drives the LED's and interprets the signals received by the position sensing detectors so that the position of the two targets may be determined and displayed in the form of x, y, and z coordinates.

11 Claims, 15 Drawing Figures

PASSIVE OPTICAL POSITION MEASUREMENT SYSTEM

BACKGROUND OF THE INVENTION

This invention relates to a passive optical position detecting and measuring system.

Generally speaking, the concept of measuring the position of an object using optical means is known. For example:

(1) Hamamatsu Systems, Inc. of Waltham, Mass. manufactures a system which measures the position of multiple points using light emitting diodes and a position sensing detector (PSD). The LED's are attached to the object whose position is to be determined and are illuminated in sequence. The position sensing detector observes the LED signals and determines the object's position in two dimensions. If three dimensional determinations are desired, two PSD's are used.

(2) Hewlett-Packard Company manufactures a coordinate determination system which uses two digital theodolites as angle measurement instruments. A computer translates data received therefrom into x, y and z coordinates. Telescope cross-hairs are used to visibly identify the target spot. An aiming point is defined by one of three methods: (1) placement of a stick-on optical tooling target on the object; (2) sighting of a feature such as a rivet, corner, etc. on the object; (3) use of a highly collimated low power laser aimed at the object.

(3) A paper entitled "Electronic Device Using the Retro-Reflective Concept" by Hodgetts, et al. discloses a system utilizing an infrared light source, a retro-reflector mounted on the user's eyeglasses and a sensor device to determine the position of the reflected light. LED's surround the sensor and illuminate the area of the user's head. The system can only measure the relative position change (in two dimensions) of one point and, consequently, an active target board is necessary.

Several U.S. Patents disclose subject matter generally relevant to the instant invention:

(1) No. 2,133,241 to Baker measures the distance to an object. The system uses two light sources placed on opposite sides of a photocell which has a lens placed in front of it. The light sources are moved by a drive system to line up the light reflected from the object with the lens. The system is designed for long distance range such as distances used in an altimeter system, and is different from the instant invention in that (a) it only measures distance, not coordinates; (b) only one sensor is used; (c) the light sources are moved to determine the distance; (d) at short distances, the system would have poor resolution and accuracy.

(2) No. 3,002,419 to Vyce discloses an optical system for detection of translation of an object from a desired spatial position. In one embodiment, motors are used to align two detectors relative to a light source to receive the desired signals. The device equates detector movement to object position. The object has mounted thereon two reflectors, one a roof reflector sensitive only to changes in the angle of incidence of the light along a horizontal axis and the other a retro-reflector which operates in a manner well known.

The system used two different wavelengths of light as each detector is sensitive to only one of these wavelengths. The system is different from the instant invention in that (a) the detectors are moved to determine location; (b) two reflectors are used with separate measurements made with each; (c) position per se is not measured, rather only relative translation from a predetermined position is determined; (d) only one target may be scrutinized.

(3) No. 3,202,040 to Burkhart discloses a system which uses reflectors attached to spaced buoys to allow a determination to be made of the position of a submarine with respect to the buoys. This system differs from the instant invention in that (a) the detector moves and the targets are stationary; (b) the system requires more than one target mirror to operate; (c) the position of the targets is pre-determined; and (d) only distance to the target is measured.

(4) No. 4,007,383 to Wessner is a device disclosed as capable of detecting the position of two objects relative to one another. The following differences from the instant invention are representative: (a) there is a significant separation between the light source and the sensor; (b) the device utilizes only one wavelength to sense location; (c) the device only measures relative angle to the target in one plane.

(5) No. 4,341,447 to Biber discloses a system wherein the distance from a camera to objects to be photographed is determined. Biber is different from the instant disclosure in that (a) the objects incude LED light sources which move therewith; (b) distance not location is measured; (c) only one wavelength of light is used; (d) only the relative angle in one plane is measured.

Further examples of U.S. Patents including subject matter generally relevant to the teachings of instant invention but less relevant than the above discussed patents are: U.S. Pat. Nos. 3,759,614, 3,773,422, 3,885,872, 4,076,383, 4,105,925, 4,207,002, 4,303,335, 4,304,487, 4,309,618, 4,313,654, 4,320,462 and 4,330,202.

SUMMARY OF THE INVENTION

Accordingly, it is an object of the present invention to provide a simply designed system which may optically locate an object or objects and display the position thereof in terms of coordinates.

It is a further object of the present invention to provide such a system in which the object or objects are passive with no light sources thereon and in which each object includes thereon a retro-reflector to reflect light back to position sensing detectors.

It is a still further object of the present invention that the light sources be stationary and be located adjacent a respective position sensing detector.

These and other objects are achieved through the instant invention which includes the following features:

A. In a first embodiment, the system includes: a pair of position sensing detectors (PSD's) each surrounded by LED's of a single wavelength. A single target with a retro-reflector mounted thereon is present in a 3-dimensional work area and circuitry including a microcomputer, analog-to-digital converter, pre-amps and driver drives the LED's and interprets signals received by the PSD's to locate the position of the target and display it.

B. In a second embodiment, the first embodiment is augmented to provide for detection of two or more targets. In this embodiment, each PSD is surrounded by LED's of different wavelengths, one wavelength for each target; each target has mounted in front of its retro-reflector a bandpass filter allowing reflection of only one of the LED wavelengths. The interfaced hardware is programmed to pulse the LED's one wavelength at a time so that the position of each of the targets may be determined and displayed in sequentially virtually simultaneous fashion.

C. In a third embodiment, the second embodiment is further modified to add additional LED's and circuitry, as explained hereinafter, to allow compensation for non-target objects which may be present in the work area and which may otherwise give false signals.

These and other objects, features and advantages of the invention will be apparent from the following more particular description of preferred embodiments, as illustrated in the following drawings.

DESCRIPTION OF THE PREFERRED EMBODIMENTS

Figure 1:
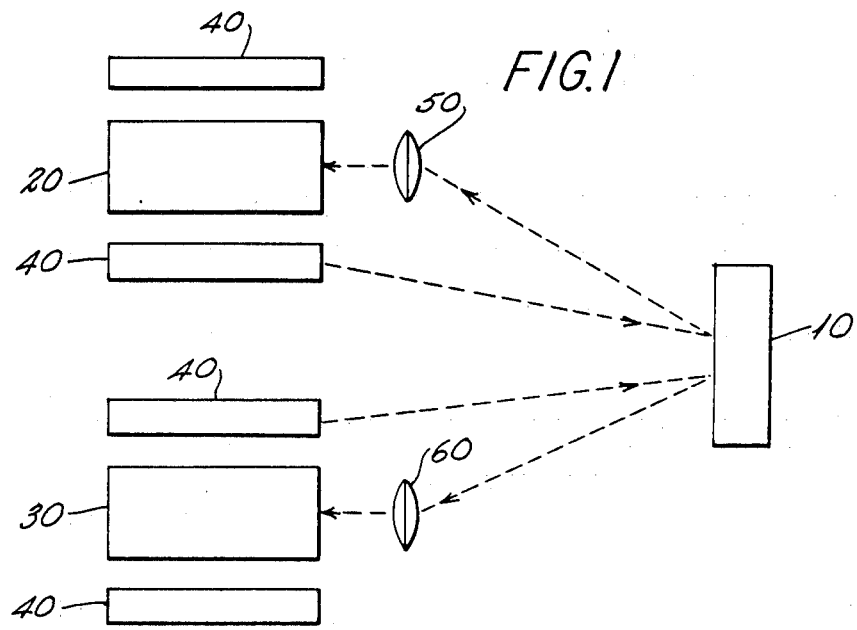
FIG. 1 shows a schematic view of a first embodiment of the invention.
Figure 3:
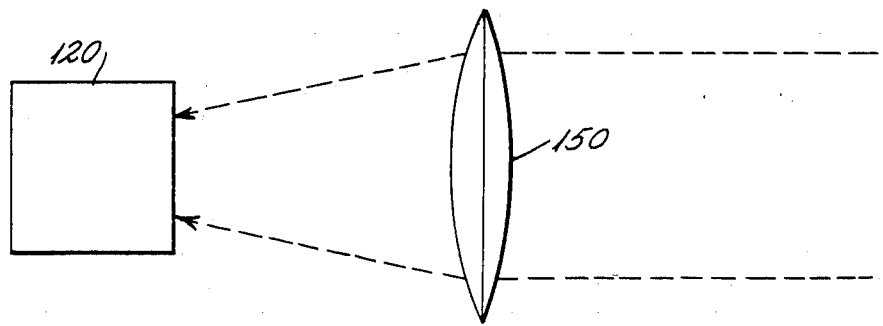
FIG. 3 shows a schematic view of the relationship between a position sensing detector and its lens.
Figure 11:
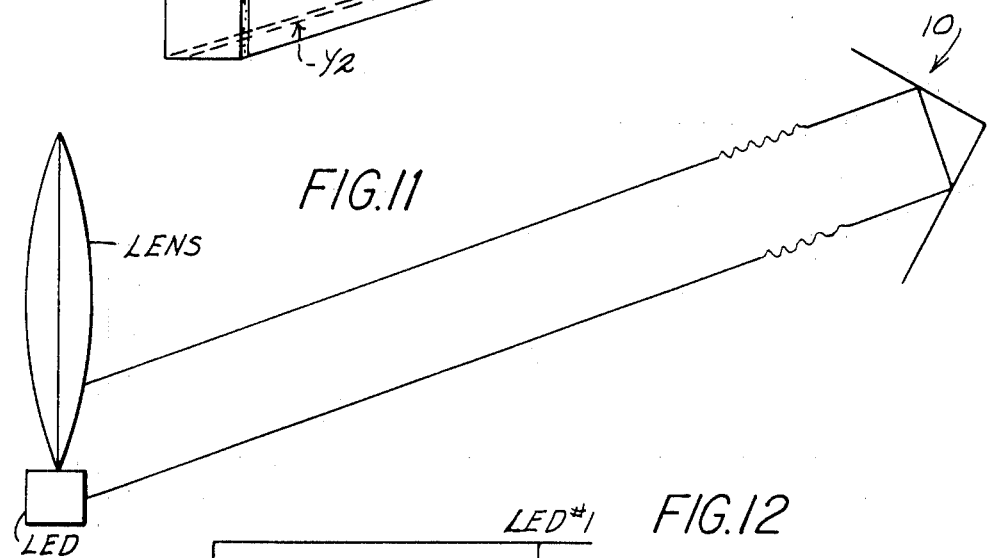
FIG. 11 shows the relationship, schematically, of the lens, LED and retro-reflector.

Referring to FIG. 1, a first embodiment of a passive optical position detecting system is shown. The system includes a target (not shown) to which is attached a retro-reflector 10 and a pair of position sensing detectors 20, 30 (PSD's hereinafter), each of which is surrounded by infrared light emitting diodes 40 (LED's hereinafter). Each LED emits the same wavelength of light. The retro-reflector 10 as best shown in FIG. 11 reflects light back to its source and as such the light emitted by LED's 40 travels to the target, is reflected by the retro-reflector 10 and travels back to its source to be focused by lenses 50, 60 onto PSD's 20, 30 respectively (FIG. 3) so that the position of the target may be detected and calculated.

Figure 2:
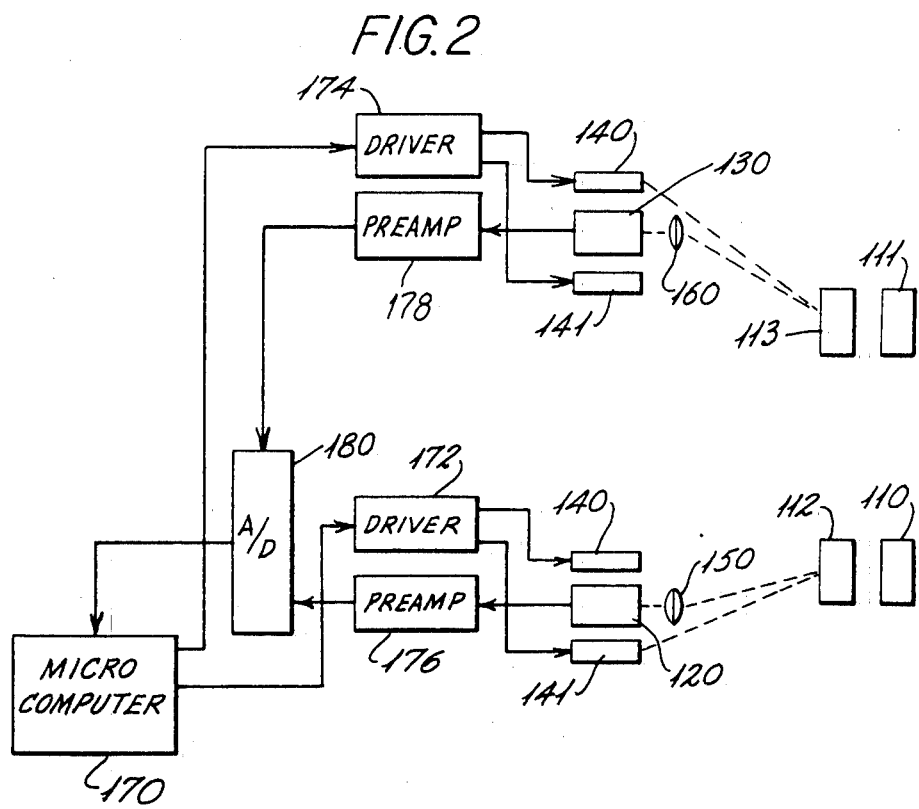
FIG. 2 shows a schematic view of a second embodiment of the invention, including associated circuitry.
Figure 12:
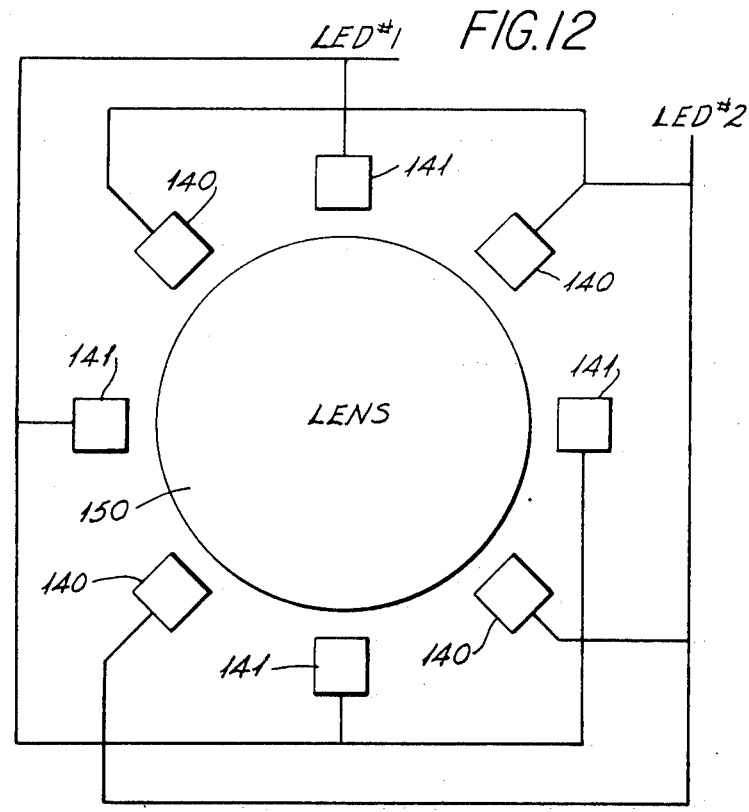
FIG. 12 shows a front view of the lens and LED's.

Referring now to FIG. 2, a second embodiment of the passive optical position detecting system is shown. This embodiment is designed to detect the position of two targets (not shown) within the work area. Each target has attached thereto a retro-reflector 110, 111 and a bandpass filter 112, 113. Surrounding each PSD 120, 130 is a plurality of LED's 140, 141 (FIG. 12). LED's 140 emit light at a distinct first wavelength whereas LED's 141 emit light at a distinct second wavelength. Bandpass filter 113 only allows light at the first wavelength to pass through it whereas bandpass filter 112 only allows light at the second wavelength to pass through it. Lenses 150 and 160 focus reflected light onto the PSD's 120 and 130 respectively. Microcomputer 170 (1) controls drivers 172, 174 which drive the LED's and (2) receives signals from PSD's 120, 130, pre-amps 176, 178 and analog-to-digital converter 180 to perform the required calculations.

The embodiment of FIG. 2 operates as follows: microcomputer 170 causes drivers 172, 174 to flash LED's 140, 141 sequentially. Due to bandpass filters 112, 113, light from LED's 140 is only reflected by retro-reflector 111 while light from LED's 141 is only reflected by retro-reflector 110. Thus sequentially, PSD's 120, 130 first receive signals indicative of the location of the target to which is attached retro-reflector 110 and then receive signals indicative of the location of the target to which retro-reflector 111 is attached. Pre-amps 176, 178 feed the PSD signals to analog-to-digital converter 180 which sends them to the microcomputer 170 which calculates and displays the positions of the two targets by performing calculations well known in the art.

Figure 4:
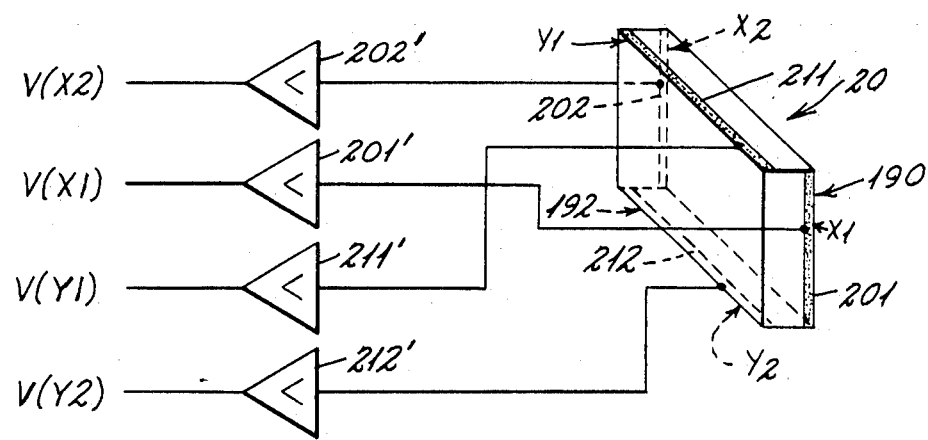
FIG. 4 shows a schematic view of a position sensing detector with transimpedance pre-amps connected therewith.
Figure 5:
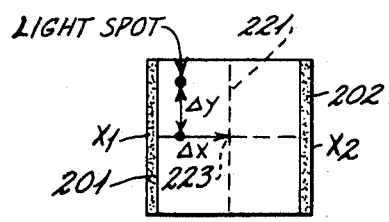
FIG. 5 shows a front view of a position sensing detector.
Figure 6:
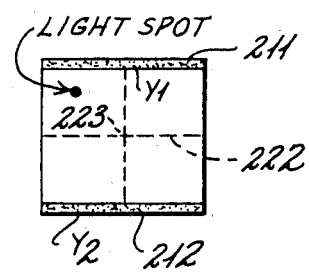
FIG. 6 shows a back view of the position sensing detector.

Referring now to FIGS. 4–6, the PSD's will be explained in greater detail. In each of the embodiments, the PSD's used are the same and PSD 20 is meant to be exemplary to the other PSD's. PSD 20 uses a highly sensitive planar type PIN silicon photodiode with uniform layers formed on the top and bottom thereof. When a light spot is focused upon the active area of the PSD, electron-hole pairs are generated at the focused spot in the depletion layer thereof. Output currents are thereby formed on both resistive layers 190, 192 at each of the four electrodes, X-axis electrodes 201, 202 and Y-axis electrodes 211, 212. Currents to electrodes 201, 202 are collected through top resistive layer 190 whereas currents to electrodes 211, 212 are collected through bottom resistive layer 192. These currents are divided in proportion to the resistance between the focused spot and the particular electrode, such resistance being proportional to the distance from the electrode to the spot. The sum of the currents from X-axis electrodes 201, 202 is proportional to light spot intensity as is the sum of the currents from Y-axis electrodes 211, 212.

The difference between the currents from the two X-axis electrodes $I_{202} - I_{201}$ is proportional to the intensity of the light spot as well as the distance of the light spot to the null line 221 (FIG. 5) midway between the X-axis electrodes 201, 202. If the light spot was directly in the middle, on the line 221, the two currents $I_{202}$ and $I_{201}$ would be equal. $I_{202} > I_{201}$ when the light spot is closer to electrode 202 and $I_{201} > I_{202}$ when the light spot is closer to electrode 201. Similarly, the difference between the currents from the two Y-axis electrodes 211, 212 is proportional to the light spot intensity and the distance of the light spot to the null line 222 (FIG. 6).

The output current from each of the electrodes is led to a respective transimpedance preamplifier 201', 202', 211', 212' which provides gain and converts the current to a proportional voltage:

$V_{201'}$ corresponding to X electrode 201;
$V_{202'}$ corresponding to X electrode 202;
$V_{211'}$ corresponding to Y electrode 211
$V_{212'}$ corresponding to Y electrode 212.

Dividing the differences of the voltages with the sum of the voltages for the X and Y electrodes will result in a figure which is proportional only to the distance of the light spot from the respective null line 221 or 222. Thus:

$$\frac{V_{201'} - V_{202'}}{V_{201'} + V_{202'}} \text{ is proportional to } \Delta X;$$

$$\frac{V_{211'} - V_{212'}}{V_{211'} + V_{212'}} \text{ is proportional to } \Delta Y.$$

In each equation, the result will be positive or negative depending upon which side of the null lines 221, 222 the light spot is located. While the location of the null lines may be adjusted electronically, in the preferred embodiments, such adjustments are not made. Bias voltages are used by the preamplifiers 201', 202', 211', 212' but only to calibrate null point 222 to be exactly in the middle of the photodiode.

The intensity of the light spot is proportional to the distance between the respective PSD and the respective retro-reflector, however, inaccuracies are inherent when measuring such intensity by summing preamplifier voltages. As such, in the preferred embodiments, this summing technique is not used.

Figure 13:
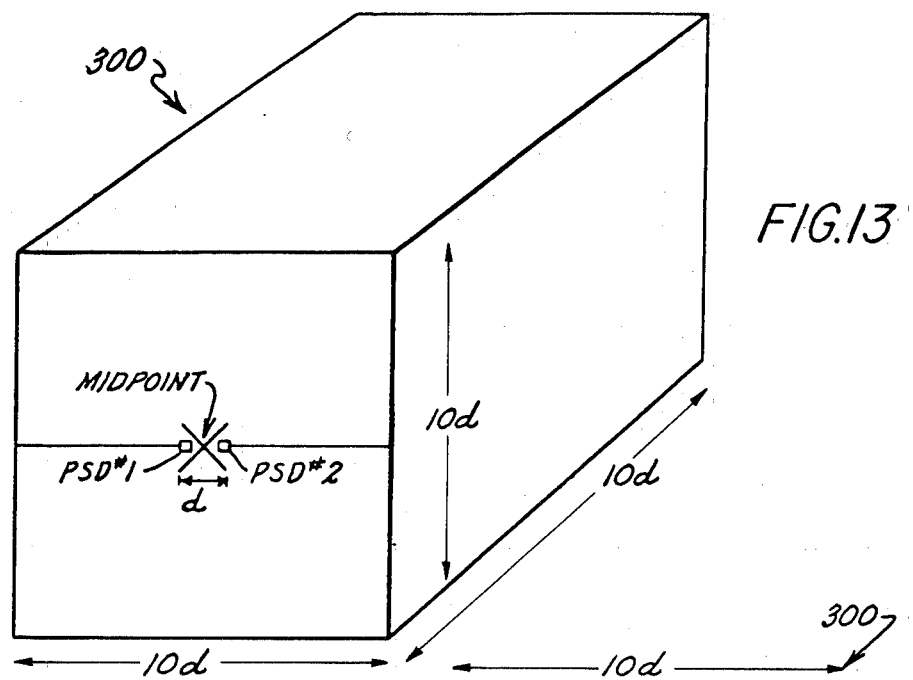
FIGS. 13 and 14 show perspective and top views, respectively, of the work area and the position sensing detectors.
Figure 14:
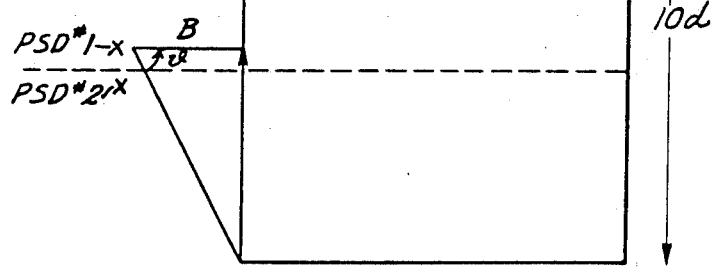

Referring now to FIGS. 7-9 and 13-14, the methodology used to determine the target position will be described. As best shown in FIGS. 13-14, the two PSD's are preferably placed a distance d apart adjacent a cube-like work area approximately 10d by 10d by 10d. The line linearly connecting the two PSD's together is on the X-axis of the work area. In the preferred embodiment, the PSD's have a field of view of 96° thus the PSD's, as shown in FIG. 14, are located in spaced relation to the work area, spaced a shortest distance B therefrom. The distance B is calculated from the following equation based upon the orientation shown in FIG. 13:

$$B = \frac{5.5 d}{\text{TAN}\left(\frac{\theta}{2}\right)}$$

where $\theta$ is the field of view. Thus, for the above set of parameters;

$$B = \frac{5.5 d}{\text{TAN}\frac{96°}{2}}$$

$$B = \frac{5.5 d}{\text{TAN } 48°}$$

$$B = \frac{5.5 d}{1.11} = 4.96 d$$

The particular beam width of the LED's chosen is not limiting since more LED's can be placed around each PSD at different angles so as to illuminate the entire work area. In the preferred embodiments, the retro-reflectors are made omnidirectional. The size of the work area is, however, dependent upon the gain of the LED's and the sensitivity of the PSD's. If desired, the PSD's may be separated by the whole work area side distance of 10d but must be separated by at least d because measuring accuracy diminishes greatly as the angle between the lines of sight diminishes. With the PSD's positioned as shown in FIGS. 13-14, no "double points" exist since values calculated are given polarity signs.

Figure 7:
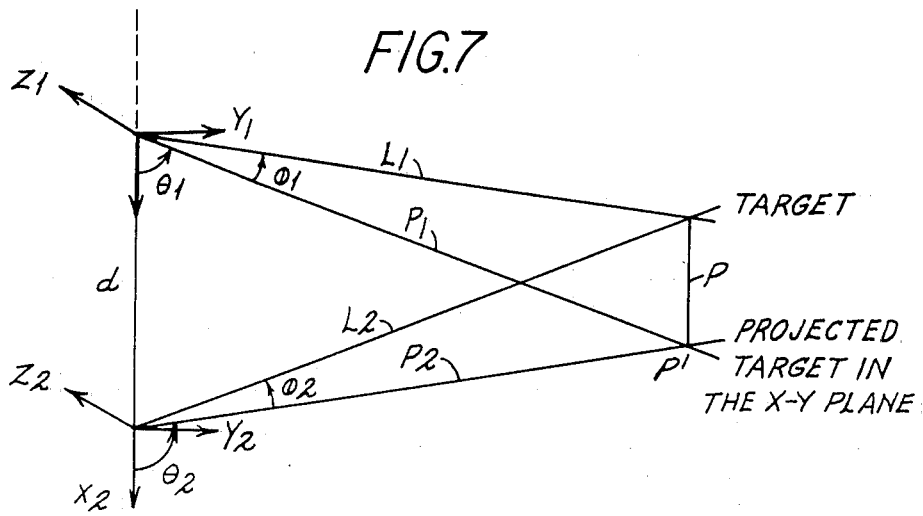
FIG. 7 shows schematically the geometry of the system of FIG. 1.
Figure 8:
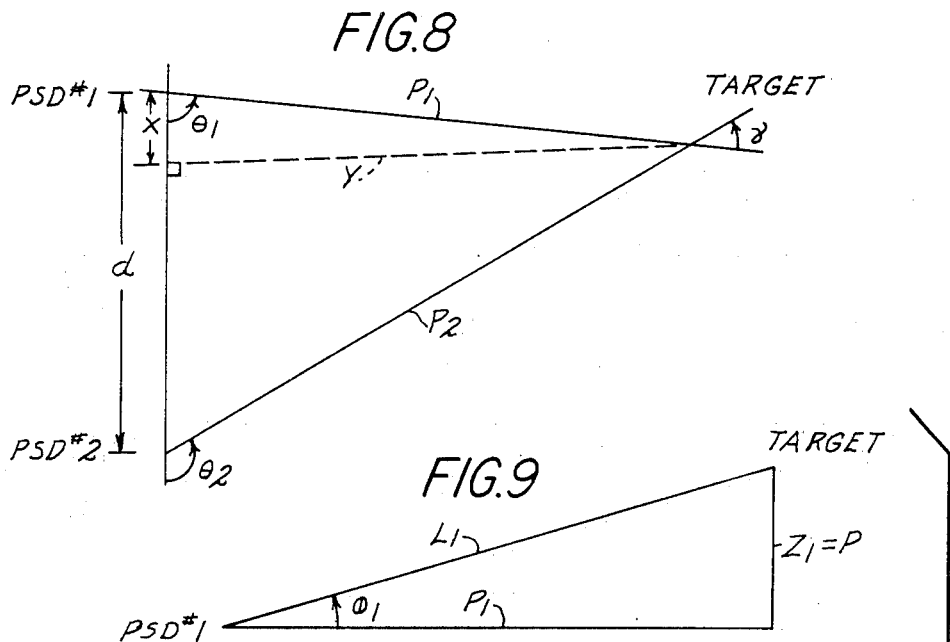
FIG. 8 shows schematically the geometry for determining the x and y coordinates of the target.
Figure 9:
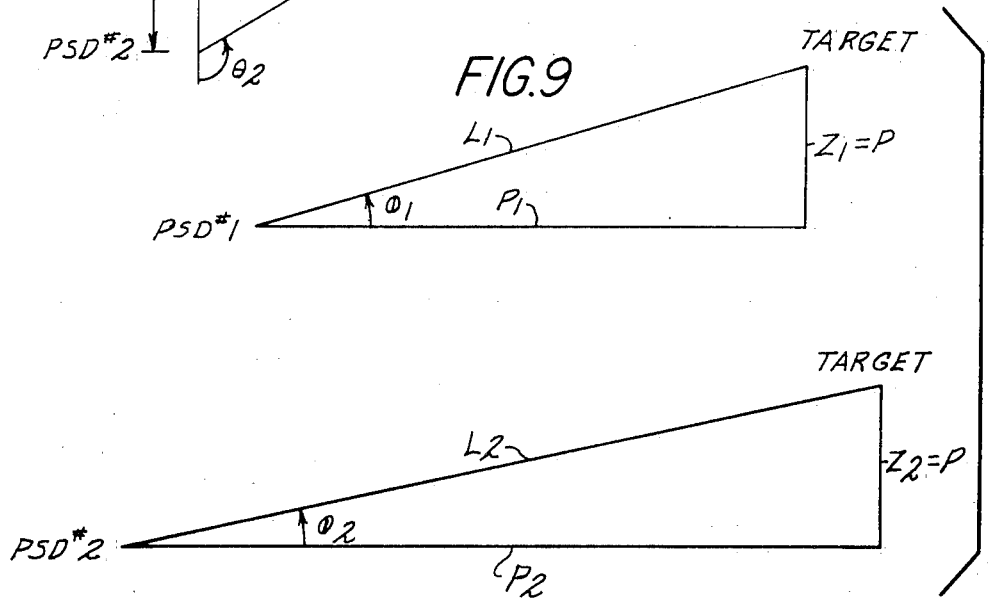
FIG. 9 shows schematically the geometry for determining the z coordinate of the target.

Referring now to FIGS. 7-9, a schematic representation of a target and PSD's, PSD1 and PSD2 is shown. The straight lines directly from each PSD to the target are known as the "lines of sight" and are shown as $L_1$ and $L_2$. As shown in FIG. 7, projections are made from the target location straight up or down to the x-y plane to determine the x and y coordinates. Thus, in the example shown, the target is above the x-y plane and projection line P goes from the target straight down to the x-y plane to define a point P' on the x-y plane. The lines $P_1$ and $P_2$ form with line d (FIG. 8) a triangle from which the x and y coordinates may be determined. The lines $P_1$ and $P_2$ are determined through knowledge of the angles $\phi_1$ and $\phi_2$ between, respectively, $L_1$ and the x-y plane and $L_2$ and the x-y plane. These angles are related to the position of the light spots on the respective PSD's.

Referring to FIG. 8, the x-y coordinates may be calculated by solving the following equations:

$$\text{TAN}\theta_1 = \frac{Y}{X}$$

$$\text{TAN}(180° - \theta_2) = -\text{TAN}\theta_2 = \frac{Y}{d - X}$$

$$Y = X\text{TAN}\theta_1 = \text{TAN}\theta_1 \left(\frac{d \text{ TAN}\theta_2}{\text{TAN}\theta_2 - \text{TAN}\theta_1}\right)$$

Referring now to FIG. 9, the z coordinate is found as follows:

The angles $\phi_1, \phi_2$ are between lines $L_1$, $P_1$ and $L_2$, $P_2$ respectively. For PSD$_1$, the line $$P_1 = \sqrt{X^2 + Y^2} \text{ (FIG. 8). Thus,}$$

$$Z_1 = P_1 \text{ TAN}\phi_1 = \sqrt{X^2 + Y^2} \text{ (TAN}\phi_1)$$

As a check on this calculation, $Z_2$ which should theoretically equal $Z_1$ is calculated as follows:

$$Z_2 = \sqrt{[(d - X)^2 + Y^2]} \text{ (TAN}\phi_2)$$

If no noise exists in the system, $Z_1 = Z_2$. To be most accurate, Z is determined by averaging $Z_1$ and $Z_2$:

$$Z = (Z_1 + Z_2)/2$$

Figure 10:
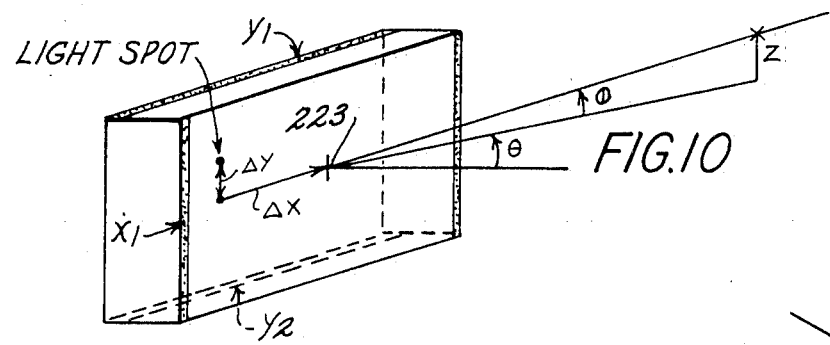
FIG. 10 shows a perspective view of the geometry for translation into polar coordinates.

So that the system will operate accurately, an initial calibration (FIG. 10) is performed. With a retro-reflector placed in a known position with known position angles $\theta$ and $\phi$, output voltages are measured, distances $\Delta K$ and $\Delta Y$ are calculated and then compared with the known values to arrive at the constants $K_1$ and $K_2$:

$$K_1 = \theta/\Delta X$$

$$K_2 = \phi/\Delta Y$$

These calculations may be repeated with the retro-reflector placed in various locations to more accurately calculate $K_1$ and $K_2$.

Figure 15:
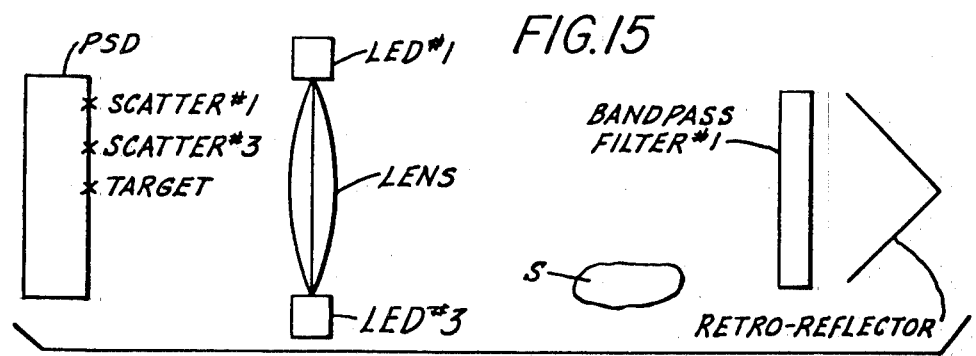
FIG. 15 shows a third embodiment of the invention with additional LED's to compensate for non-target objects in the work area.

Referring now to FIG. 15, a third embodiment of the invention is shown. As shown, a PSD with associated lens and LED's is used to detect the position of a target (not shown) to which a retro-reflector and bandpass filter corresponding to the wavelength of LED #1 is attached. A scattering object S is shown in the work area. LED #1 is used to detect the position of the target whereas LED #3 is used to compensate for optical scatters; infrared light from LED #3 will not penetrate the bandpass filter. Thus, when the system is operating, light from LED #1 will cause two light spots to appear at the PSD, one from the target and one from the scattering object whereas light from LED #3 will only cause one light spot to appear at the PSD, caused by reflection of light from the scattering object. Thus, the system may compensate for the scatter by subtracting the signal from object S caused by LED #3 from the signal from object S and the target caused by LED #1. If LED #1 and LED #3 were located in the same spot, the signals from object S would also appear at the same spot allowing easier compensation. One skilled in the art with knowledge of the spacing of LED #1 from LED #3 would be able to perform the compensation calculations for scattering accordingly.

In the preferred embodiments, any microcomputer, analog-to-digital converter and drivers may be used. It is preferred that United Detector Technology SC series Position Sensing Detectors be used in the above disclosed embodiments.

While the PSD has been described as a planar type PIN silicon photodiode, other types of PSD could also be used in the system:

(a) The PSD could comprise a CCD array with necessary accompanying circuitry well known to those skilled in the art.

(b) The PSD could also comprise a modified 1K dynamic RAM memory, again, with the necessary control and drive circuitry.

In each case, a lens will focus a light dot onto the active area thereof.

If desired, an ambient light filter may be placed in front of each PSD focusing lens specially designed to prevent reception by the PSD of natural light which could cause errors.

The retro-reflector should be omnidirectional, reflecting received light back parallel to the source of such light as shown in FIG. 11.

The inventive system has been disclosed as used in conjunction with a host microcomputer via an analog-to-digital converter. It is considered to be within the purview of this invention to provide a system without such a host computer. In such a situation, the control and calculation would be built around a microprocessor and interface with the system via an A/D converter.

If desired, the PSD's may be mounted on a clamp-like member so as to ease the system's adaptation to any work area.

Many applications of the inventive system are possible, as exemplified by the following:

(a) time and motion studies
(b) gaitanalysis
(c) computer graphics
(d) computer games
(e) stress and vibration monitoring of machines and large structures
(f) alignment, angle measurement and boresighting
(g) communications—use as a direct input device for communication and control devices
(h) robotics—robot outfitted with PSD's locates targets.

While the invention has been particularly shown and described with references to the preferred embodiments thereof, it will be understood by those skilled in the art that various changes in form and detail may be made therein without departing from the spirit and scope of the invention as recited in the following claims.

I claim:

1. A passive optical position measurement system for determining and displaying the position of an object within a three-dimensional work area comprising:

(a) at least two position sensing detectors positioned a pre-determined spaced distance apart from one another and positioned in substantially a common plane substantially adjacent to the periphery of said work area;

(b) first reflecting means located within said work area and adapted to be attached to a first object, the position of which is to be detected;

(c) second reflecting means located within said work area and adapted to be attached to a second object, the position of which is to be detected;

(d) light source means positioned adjacent each position sensing detector, said light source means including distinct light sources, each generating a distinct different light wavelength, the number of distinct light sources corresponding to the number of objects;

(e) each reflecting means including distinct filter means positioned in front of the reflective portion, each filter means allowing light therethrough with only one of said wavelengths and each said filter means corresponding to a wavelength different from all other filter means;

(f) means controlling said position sensing detectors and light source means whereby said light source means may be activated to emit light therefrom, said controlling means sequentially pulsing said light sources of distinct different wavelengths, said light from each respective said light source means reflecting from said reflecting means directly back to the position sensing detector adjacent to the respective said light source means and said controlling means receiving signals from said position sensing detectors to calculate and display the position of said first and second objects in three dimensions;

(g) a further light source means generating light at a distanct wavelength from the wavelengths of said light sources corresponding to said objects; said further light source means each being positioned adjacent a position sensing detector; and (h) said controlling means pulsing said further light source means and including means for interpreting signals received by said position sensing detectors from said further light source means to allow compensation for scattering objects within said work area, the position of which is not desired to be detected and displayed.

2. The system of claim 1 wherein each said position sensing detector includes a focusing lens which focuses said light into a spot which is received on an active area of each said position sensing detector.

3. The system of claim 1 wherein said reflecting means comprises retro-reflector means.

4. The system of claim 3 wherein said retro-reflector means comprises omnidirectional retro-reflector means.

5. The system of claim 1 wherein said light source means comprises a plurality of light emitting diodes.

6. The system of claim 6 wherein each said position sensing detector includes a focusing lens which focuses said light into a spot which is received on an active area of each said position sensing detector, said light emitting diodes being located in surrounding relation to each said focusing lens.

7. The system of any one of claims 5 or 6, wherein said light emitting diodes emit infrared light.

8. The system of claim 1 wherein said controlling means comprises:
   (a) driver means for controlling said light source means;
   (b) analog-to-digital converter means for receiving signals from said position sensing detectors; and
   (c) computer means for controlling said driver means, interpreting signals received from said analog-to-digital converter means and displaying said position in three dimensions.

9. The system of claim 8 wherein a plurality of transimpedance amplifiers and interposed between each position sensing detector and said converter, said preamplifiers converting currents generated by said detectors into voltages which are received by said converter.

10. The system of claim 1 wherein signals received by said position sensing detectors reflected from said scattering objects, which signals have been transmitted by all said distinct light sources, are used to allow said compensation.

11. In a passive optical position measurement system for determining and displaying the position of one or more objects within a work area, the system including a pair of position sensing detectors located adjacent said work area, a reflecting means attached to each object the position of which is to be determined, a pair of light sources of distinct wavelengths positioned adjacent each detector, optical filters mounted in front of each reflecting means each filter allowing only one of said distinct wavelengths to pass therethrough, said filters corresponding to different ones of said distinct wavelengths, and controlling means for controlling said light sources and calculating said position, a method for compensating for scattering objects within the work area comprising the steps of:
   (a) providing a further light source adjacent said pair of light sources,
   (b) programming said controlling means to (1) receive signals transmitted from said pair of light sources and said further light source and reflected off said scattering objects, and (2) perform calculations responsive to receipt of said signals to compensate for said scattering objects and allow accurate determination of the position of said one or more objects.

* * * * *

UNITED STATES PATENT AND TRADEMARK OFFICE
CERTIFICATE OF CORRECTION

PATENT NO. : 4,576,481
DATED : March 18, 1986
INVENTOR(S) : PER K. HANSEN

It is certified that error appears in the above-identified patent and that said Letters Patent is hereby corrected as shown below:

```
Claim 6, line 1, (column 9, line 3)
    delete "claim 6", insert --claim 5--.

Claim 9, line 2, (column 9, line 22)
    delete "amplifiers", insert --preamplifiers--.
    delete "and", insert --are--.
```

Signed and Sealed this

Tenth Day of June 1986

[SEAL]

Attest:

DONALD J. QUIGG

Attesting Officer

Commissioner of Patents and Trademarks